United States Patent [19]

Volk et al.

[11] Patent Number: 4,667,982
[45] Date of Patent: May 26, 1987

[54] SAFETY BELT SYSTEM, ESPECIALLY IN A MOTOR VEHICLE

[75] Inventors: Hans-Joachim Volk, Ebersdorf/OT Frohnlach; Herbert Becker, Coburg; Claus Dallwig, Roedental/Blumenrod, all of Fed. Rep. of Germany

[73] Assignee: Brose Fahrzeugteile GmbH & Co. KG, Fed. Rep. of Germany

[21] Appl. No.: 770,211

[22] Filed: Aug. 28, 1985

[30] Foreign Application Priority Data

Sep. 5, 1984 [DE] Fed. Rep. of Germany ....... 3432669

[51] Int. Cl.[4] .............................................. B60R 22/18
[52] U.S. Cl. .................................. 280/808; 297/483; 297/486
[58] Field of Search ................. 280/801, 808; 297/483, 297/486

[56] References Cited

U.S. PATENT DOCUMENTS 4,336,957 6/1982 Schultz et al. ...................... 280/808

FOREIGN PATENT DOCUMENTS 2713172 3/1977 Fed. Rep. of Germany .
2543784 5/1977 Fed. Rep. of Germany ...... 280/808
2824044 12/1979 Fed. Rep. of Germany .
P3302163.5 8/1984 Fed. Rep. of Germany .
8007635 10/1981 France .

Primary Examiner—John J. Love
Assistant Examiner—Kenneth R. Rice
Attorney, Agent, or Firm—Barnes & Thornburg

[57] ABSTRACT

A safety belt system comprising a belt displacer for a belt which is so constructed as to transport a section of the safety belt between a retracted position and a seizing position for purposes of facilitating fastening of the belt, is provided for its use with a three-point safety belt, in which the belt ends are attached at the seat bearer respectively at the seat on one side of the seat and run over a belt base point and a belt shoulder point. The belt displacer includes a belt deflection element which within the area between the belt ends engages at the belt and is displaceable along the belt. In the seizing position of the belt displacer, the belt buckle to be inserted into the belt lock is arranged within the area of the belt deflection element and can therefore be easily reached. As soon as the belt buckle is inserted into the belt lock, the belt displacer travels back into the retracted position.

32 Claims, 9 Drawing Figures

SAFETY BELT SYSTEM, ESPECIALLY IN A MOTOR VEHICLE

The present invention relates to a safety belt system, especially in a motor vehicle, with a belt displacer which is constructed for the purpose to transport a section of a safety belt between a retracted position and a seizing position for facilitating the fastening of the belt.

Such a safety belt system is described in the DE-OS No. 21 08 483. The belt displacer thereby serves to transport or displace the three belt end of a safety belt from a retracted position within the area of the motor vehicle B-column, in which the belt end can be reached only with difficulty by the belt user, into a seizing position adjacent the belt user in which the belt user can comfortably reach the belt. The free belt end can then be easily removed for connection with the belt lock or latching mechanism. The belt is now completely separated from the belt displacer. The belt displacer remains in the seizing position for such length of time until the vehicle door is opened, apparently in order that prior thereto the free belt end can again be secured by the belt user at the belt displacer.

The object of the present invention, in contrast, resides in constructing a safety belt system with a belt displacer of the aforementioned type and with a three-point safety belt which is considerably more easy to use.

The underlying problems are solved according to the present invention in that with a three-point safety belt system having belt ends attached at the seat bearer respectively at the seat on one seat side and running over a belt base point and a belt shoulder point, which includes a belt retractor mechanism and a belt buckle provided at the belt between the belt ends for insertion into a belt lock or latching mechanism arranged on the other seat side, the belt displacer is provided with a belt deflection element displaceable along the belt and always engaging at the belt within the area between the belt ends, in that in the seizing position the belt buckle is arranged within the area of the belt deflection element, and in that with a belt buckle removed from the belt displacer, the belt displacer is operable to travel back into the retracted position.

The deflection element of the belt displacer according to the present invention takes along the belt during its movement from the retracted position into the seizing position, whereby it sweeps along the belt depending on the type of fastening of the belt ends. In the seizing position the belt user can comfortably and easily seize the belt buckle and move the same toward the belt lock or latching mechanism. However, the belt thereby remains in connection with the belt displacer; in case of a belt retracting mechanism for the shoulder point belt end, the belt is pulled over the belt deflection element. As soon as the belt buckle is removed from the belt displacer, at the latest, however, after the closing of the belt lock or latching mechanism, the belt deflection element travels again back into the retracted position by corresponding switching contacts whereby it travels correspondingly along the shoulder belt section between the shoulder point and the belt lock or latching mechanism. In the retracted position the belt displacer is disposed directly in the area of the belt shoulder point within the area of the B-column; even though the belt always runs by way of the belt displacer, the belt forces act essentially directly on the belt shoulder point with a fastened belt and not on the belt displacer. The safety belt system of this invention is particularly easy to use because during the fastening of the belt, only the belt buckle has to be seized and inserted into the belt lock or latching mechanism and during the release of the safety belt, when the belt user opens the belt latching mechanism, the retractor mechanism automatically takes care for the return movement of the belt together with the belt buckle into the starting position. A removal of the belt end from the belt displacer requiring an increased care, as with the known prior art installation, as well as correspondingly a reattachment of the belt end at the belt displacer is thus dispensed with according to the present invention. The belt displacer which after the fastening of the belt is in the retracted position, forms no interfering optical annoyance for the belt user during the drive nor does it actually or seemingly impair the freedom of movement of the belt user.

In case the belt end at the shoulder point is attached to a retractor mechanism with a belt blocking device, the present invention proposes to provide an abutment element for the belt buckle at the belt between the belt deflection element and the belt base point which permits a movement of the belt buckle only between the abutment element and the belt deflection element. The abutment element thus automatically assures that the belt buckle always assumes the correct location in the seizing position of the belt displacer.

In the prior art belt displacer system the belt displacer head, which readies the free belt end, is located at one end of a horizontal piston rod (or spring band), which is displaceably supported in a vacuum piston within the body sidewall to the rear of the corresponding vehicle door, as viewed in the driving direction, and approximately at the height of the door lock. Within the movement area of the piston rod, the door covering is correspondingly offset toward the inside. This arrangement is disadvantageous, on the one hand, in that it can be realized without great installation problems only with two door vehicles and, on the other, in that the danger of a bending of the piston rod exists. For avoiding these disadvantages, a belt displacer guide rail is proposed in accordance with the present invention which extends along the motor vehicle roof.

In order to faciliate the installation of the safety belt system and additionally, in case of a system failure, to be able to attach and remove the belt nonetheless, it is proposed according to the present invention to construct the belt deflection element surrounding the belt so as to be openable for the insertion respectively removal of the belt.

For reducing the friction between the belt and the belt deflection element, a deflection roller is proposed according to the present invention which is rotatably supported at a belt displacer-lug. This reduces, on the one hand, the actuating force for moving the belt displacer into the seizing position and, on the other, facilitates pulling the belt buckle in the direction toward the belt lock or latching mechanism when fastening the belt.

In order to enable with such a construction the insertion and removal of the belt with structurally simple means, the deflection roller is detachably mounted at the belt displacer-lug, preferably by a two-partite construction of the roller with its roller parts displaceable toward one another in the axial direction against a spring force. The subdivision of the deflection roller is unobtrusive, above all by reason of the belt guided over the same; sufficient mechanical stability is assured.

In order to assure with a belt displacer-guide rail extending in the area of the vehicle roof and with a belt deflection element arranged in the retracted position within the area of the belt shoulder point and correspondingly spaced from the guide rail, that the belt displacer lies as close as possible at the curved B-column and does not project into the passenger space, it is further proposed according to the present invention that the belt displacer includes an elongated, bending-elastic connecting element which connects the belt deflection element with a guide rail runner or roller. The connecting element may be formed of a flexible metal cable-core which is molded about with plastic material, preferably molded about with foamed material. By reason of the flexible metal cable-core, the connecting element, on the one hand, is so elastic that it follows within limits the belt movement during the fastening operation so that the danger of damaging the belt displacer rail or the guide rail runner or roller by reason of corresponding torque and tilting moments is eliminated; on the other hand, the connecting element is elastic to such an extent that in the retracted position it abuts closely at the B-column so that the connecting element and the belt lug do not enter interferingly into the passenger space. By spraying or molding a plastic foam about the metal cable, a pleasing appearance is obtained, especially in case of a foamed color matched to the interior of the vehicle; injuries at the connecting element as precluded.

In order that the belt deflection element (with a deflection roller or with a rigid deflection lug) will always so align itself that the belts slides over the belt deflection element with only a slight force application, it is proposed according to the present invention to support the belt deflection element, respectively, the guide rail runner rotatably and tiltable at the connecting element. This is achieved preferably by a ball joint.

In order to preclude beforehand jamming or wedging of objects or body parts by the belt displacer traveling into the retracted position (for example, with an opened door or with an opened door window), it is additionally proposed according to the present invention that the belt displacer is correspondingly detachably mounted at the guide rail-runner. A wedging or jamming-in between the returning connecting element and the door respectively window frame is therefore precluded thereby.

The detachable fastening can be realized with structurally simple means according to the present invention by a detent connection between the runner and the belt displacer. With a detent pin extending parallel to the longitudinal direction of the guide rail, the danger of a faulty, undesired disengagement by reason of corresponding tensional forces acting on the belt displacer and extending in the direction of the connecting element are precluded. With a cylindrical shape of the detent pin according to the present invention, the connecting element can be correspondingly freely pivoted with respect to the guide rail-runner so that damaging of the guide rail-runner respectively of the guide rail by reason of correspondingly large torques is precluded.

In an alternative realization according to the present invention the runner is connected with the belt displacer by way of a detent-pawl connection so that a faulty, undesired disengagement can be avoided practically completely. The detent pawl according to the present invention is released exclusively when the connecting element is bent about an axis perpendicular to the longitudinal direction of the connecting element. This is achieved with structurally simple means by the spring band according to the present invention. During the bending of the connecting element the spring band increases its effective length and thus releases the detent pawl so that the connecting element is able to disengage itself from the runner.

These and other objects, features and advantages of the present invention will become more apparent from the following description when taken in connection with the accompanying drawing which shows, for purposes of illustration only, several embodiments in accordance with the present invention, and wherein:

Figure 1:
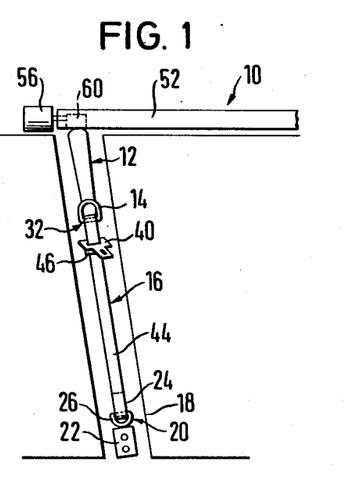
FIG. 1 is a strongly simplified elevational view of the safety belt system according to the present invention within the area of the B-column of a motor vehicle in the retracted position of the belt displacer.
Figure 2:
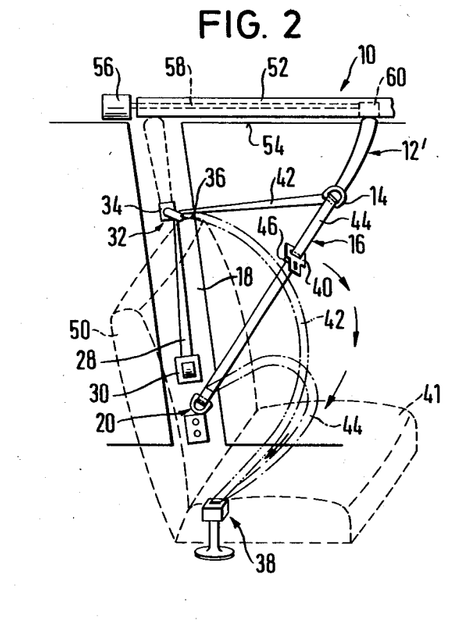
FIG. 2 is an elevational view, similar to FIG. 1, but illustrating safety belt system in the seizing position of the belt displacer.

Referring now to the drawing wherein like reference numerals are used throughout the various views to designate like parts, and more particularly to FIGS. 1 and 2, a safety belt system generally designated by reference numeral 10 is illustrated in these figures in a strongly simplified manner. The safety belt system 10 includes a belt displacer generally designated by reference numeral 12 which engages by means of a belt deflection element 14 at a three-point safety belt generally designated by reference numeral 16 within the area between the belt ends thereof attached at the motor vehicle, for example at the illustrated B-column 18. The belt end defining the belt base point generally designated by reference numeral 20 is attached securely at the B-column 18 in a customary manner. A belt fitting 22 with a pivotal lug 26 retaining the belt end 24 is secured at the B-column 18 as can be seen in these figures. The other belt end 28 is coupled to a conventional retractor mechanism 30 which a conventional belt blocking device of commercially available type. This is indicated at FIG. 2. From the retractor mechanism 30 the belt 16 extends upwardly toward a belt deflection fitting defining the belt shoulder point generally designated by reference numeral 32. This fitting, in turn, is provided with a pivotal bow-shaped lug 36 surrounding the belt 16. Subsequently the belt runs through the already mentioned belt deflection element 14 of the belt displacer and then to the belt base point 20 already mentioned also hereinabove.

The third point of the fastened safety belt 16 is formed by a belt lock or latching mechanism generally designated by reference numeral 38 which is of conventional construction and is attached in a customary manner between the seats of the motor vehicle. A seat 41 indicated in dash line can be seen in FIG. 2 (the left seat as viewed in the driving direction). The belt 16 is attached in the usual manner in that a belt buckle 40 provided between the belt ends is inserted into the belt lock or latching mechanism 38. An upper belt section 42 indicated in FIG. 2 in dash and dotted lines extends between the belt shoulder point 32 and the belt lock or latching mechanism 38; a lower section 44 of the belt indicated in dash and dotted lines extends between the lock or latching mechanism 38 and the lower belt base point 20.

In the retracted position of the belt displacer 12 according to FIG. 1 the deflection element 14 of the belt displacer 12 is located within the area of the deflection fitting determining or fixing the belt shoulder point 32. The upper section 42 is therefore correspondingly strongly shortened. The lower section 44 extends along the B-column 18. Thus, this position of the safety belt corresponds in the retracted position of the belt displacer to the belt position in conventional three-point safety systems without belt displacer. The belt buckle 40 which is retained at a minimum height barely below the belt shoulder point 32 with the aid of an abutment element 46 fixed at the belt, is certainly not reachable comfortably and easily by the person seated on the seat 41 because it is located adjacent to or even to the rear of the backrest 50 of the seat 41.

In order to bring the belt buckle 40 into a considerably more convenient reachable position prior to the fastening of the belt, the belt displacer 12 is displaceable by means of a motor into the seizing position 12' shown in FIG. 2. It can be seen from this figure that the belt buckle 40 is now located laterally in front of the backrest 50 of the seat 41 and can be seized without twisting of the upper body, for example with the right hand of the person seated on the seat 41 and can be guided to the belt lock or latching mechanism 38 without changing hands.

For that purpose, the belt displacer 12 is displaceable along a guide rail 52 which extends at the motor vehicle roof within the area of the upper door opening edge 54. A drive unit 56 is indicated in FIGS. 1 and 2 which engages by way of a force transmitting element 52 (FIG. 2), for example a tension- and compression-rigid cable or a threaded cable or a spring band or the like, at a runner or roller 60 guided at the guide rail 52. The drive unit 56, of course, can also be arranged at the other end of the guide rail 52 or spaced therefrom within the area of the A-column or of the engine space. For controlling the displacement movement of the runner 60, switches actuatable by the runner 60 may be provided at the guide rail; a symbolically indicated limit switch 62 can be seen in FIG. 3. Deviating from the embodiment of FIGS. 1 and 2, the drive unit is provided in FIG. 3 at the right end of the guide rail 52, as viewed in FIGS. 1 to 3, so that correspondingly the force transmitting member 64 extends from the runner 60 toward the right.

Prior to fastening the belt 16, the belt displacer 12 therefore travels from its retracted position in FIG. 1 into the seizing position according to FIG. 2. This operation an be initiated or triggered for example in that a door contact is actuated during the closing of the door, which possibly coupled with the ignition switch, causes an actuation of the drive unit for the belt displacer (electrically, pneumatically or hydraulically actuated drive unit). After the insertion of the belt buckle into the belt lock, the belt displacer 12 can be displaced back into the starting position, especially initiated by a corresponding switch in the belt lock. The retraction, however, may also be initiated already when the belt buckle is seized by the user and is moved toward the belt lock or latching mechanism; for example, a switch integrated in the belt displacer and reacting to the change in load of the belt displacer may be used as trigger switch. The belt 16 is now in the customary three point fastened belt position. For releasing or disengaging the belt 16, only the belt lock 38 has to be correspondingly opened whereupon the belt is retracted under the force of the retractor mechanism and is wound up until it assumes the position according to FIG. 1.

Figures 3, 4:
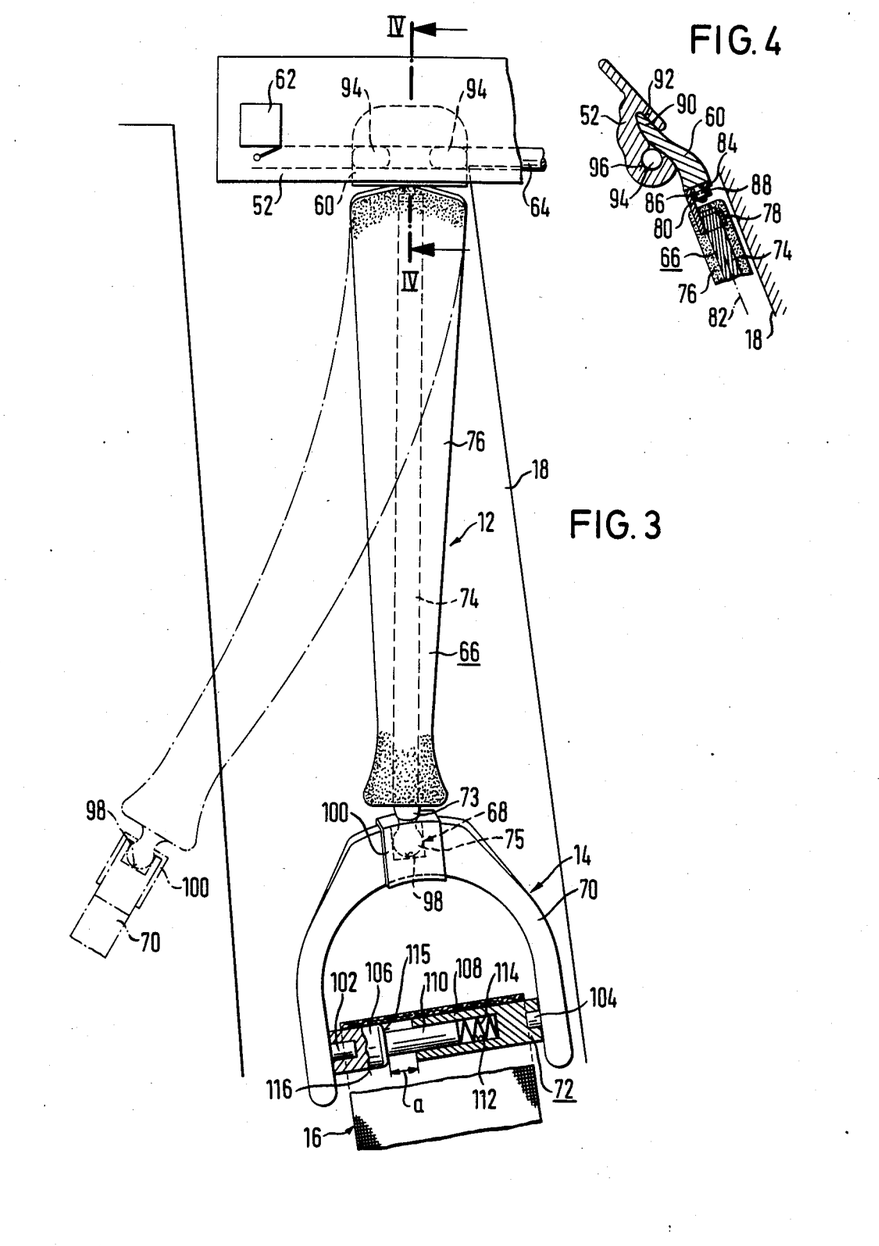
FIG. 3 is an elevational view of a detail of the belt displacer of the system according to FIGS. 1 and 2, shown partly in cross-section.
FIG. 4 is a partial cross-sectional view through the belt displacer of FIG. 3 within the area of the guide rail and taken along line IV—IV of FIG. 3.

The belt displacer 12 is illustrated in greater detail in FIG. 3. It consists of the already mentioned runner or roller 60, of a longitudinal connecting element 66 which is rigidly secured at the runner 60, and of the belt displacer/deflection element 14 which is attached by way of a ball joint generally designated by reference numeral 68 at the other end of the connecting elements 66. The belt deflection element 14, in turn, consists of an essentially U-shaped belt displacer lug 70 and of a two-partite deflection roller 72 fitted between the side legs of the belt displacer lug.

The connection element 66 is formed by a metallic cable-core 74 which is molded about with a plastic foamed layer 76. For example, a metal strap 78 indicated in FIG. 4 serves for the fastening at the runner 60; the metal strap 28, on the one hand, surrounds the core 74 and, on the other, is constructed with an L-angle 80 whose free leg 84 extending perpendicular to the longitudinal axis 82 of the core 74 is traversed by a threaded pin 86 at the lower end of the runner 60 and is secured at the runner 60 by means of a nut 88 screwed over this pin.

The runner 60 includes, on the one hand, a nose portion 90 projecting upwardly toward the left in FIG. 4 which engages in a corresponding longitudinal groove 92 of the guide rail 52 and, on the other, two approximately barrel-shaped extensions 94 which engage in a corresponding approximately hollow cylindrical groove 96 of the guide rail 52. The force transmitting element 64 is connected with the runner 60 in a known manner not illustrated in detail.

The foamed-about metal cable-core 74 assures that the connecting element 76 as well as the deflection element 14 extend at a slight distance along the longitudinal B-column 18 in the retracted position of the belt displacer 12. In the seizing position 12' of the belt displacer according to FIG. 2, the foamed about core 74 can be bent more or less strongly by reason of the belt force stemming from the retractor mechanism and engaging obliquely at the belt displacer 12, as is indicated in dash and dotted line in FIG. 3. The ball joint 68 permits that the belt displacer lug 70 can be rotated and tilted corresponding to the respective belt orientation so that, on the one hand, an easy movement of the belt 16 over the belt deflection element 14 is assured and, on the other, no large torques or tilting moments act on the runner 60 and on the guide rail 52.

The ball joint 68 consists of a joint ball 75 mounted, for example, at the lower end of the core 74, as well as of a dead-end bore-like ball receiving means 98 in the center leg of the U-shape of the belt displacer-lug 70. The fixing of the ball 75 within the receiving means 98 can be attained, for example, by a sheet-metal fastening plate 100 closing off the receiving orifice up to the neck 73 or the ball 72.

Two bearing pins 102 and 104 adapted to move toward one another, are formed-out on the belt displacer lug 70 at both side legs of the U-shape of the lug for the rotatable support of the two-partite roller 72. The bearing pins 102 and 104 engage in corresponding bearing apertures of the two roller parts 106 and 108. The left roller part 106 in FIG. 3 engages with an axial cylindrical bearing projection 110 of reduced diameter into a corresponding axial bearing aperture 112 of the other roller part 108. A coil compression spring 140, which is inserted into the aperture, is supported, on the one hand, at the end face of the bearing projection 110 and, on the other, at the bottom of the aperture, and thus presses the two roller parts 106 and 108 away from one another in the direction toward the side legs of the belt displacer lug 70. The left end of the right roller part 108, as viewed in FIG. 3, has a spacing a from a radial circular ring surface 115 which is formed between a section 116 guiding thereabout the belt 16 and the projection 110 of the left roller part 106 which is reduced in diameter. Since the accommodating space for the coil spring 114 has in the position according to FIG. 3 at least an axial length corresponding to the dimension a, the two roller parts 106 and 108 can be slid one within the other against the force of the coil compression spring 114, i.e. nested one within the other. Since the axial length of at least one of the two projections 102 and 104 of the lug 70 is smaller than this length a, the two-partite deflection roller 72 an be disconnected from the lug 70 without any problem by a corresponding compression of the roller part 106 and 108. This permits to insert the belt 16 into the deflection element 14 or to remove the same from the deflection element at any time. In case of a failure in the operation of the safety belt system, for example when the belt displacer 12 remains in its seizing position 12' according to FIG. 2 notwithstanding the fact that the belt has been fastened, the belt 16 can be detached without difficulty from the belt deflection element 14.

During a retraction of the belt displacer from its seizing position into the return position, an object or a body part might under some circumstances be jammmed or wedged in between the belt displacer travelling back and the door frame (with open vehicle door) or the window frame with closed vehicle door however with opened window). By reason of the flexibility of the belt displacer, it normally will not lead to any serious injuries or damages. However, in order to avoid under all circumstances an injury respectively a damage, and in order to remove from the user any fear or inhibition against the use of the system, provision is made in the embodiments according to FIGS. 5 to 7 respectively 8 and 9 to be described more fully hereinafter that the belt displacer becomes detached from the runner when it encounters an obstacle during its travel-back to the retracted position.

Figure 5:
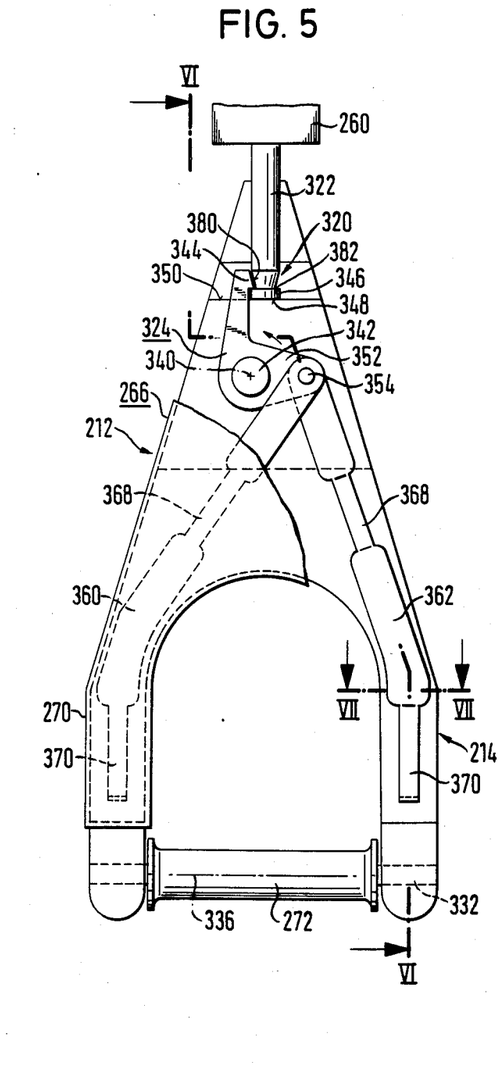
FIG. 5 is an elevational view, partly broken away, of a second embodiment of the belt displacer in accordance with the present invention.
Figures 6, 7:
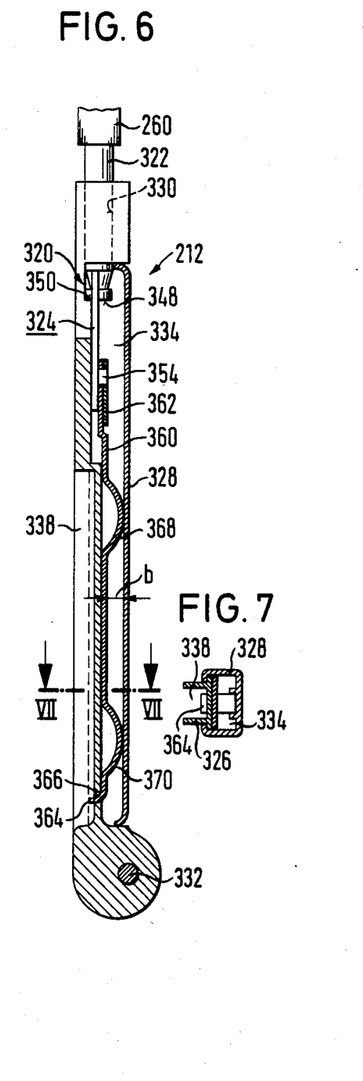
FIG. 6 is a cross-sectional view of the belt displacer taken along line VI—VI of FIG. 5.
FIG. 7 is a cross-sectional view of the belt displacer according to FIGS. 5 and 6, taken along line VII—VII of FIG. 6.

In the first embodiment according to FIGS. 5 to 7 the belt displacer is generally designated by reference numeral 212. Parts which correspond to those of the embodiment according to FIGS. 1 through 4 are correspondingly designated by the same reference numerals, however, of the 200 series. The belt displacer 212 is connected with the runner 260, shown only in part, by way of a detent connection generally designated by reference numeral 320 which is formed by a detent pin 322 starting from the runner 260 as well as by a two-armed detent pawl 324 supported at the connecting element 266 of the belt displacer 212. The connecting element 266 is made in one piece with the belt displacer lug 270. The deflection roller 272 rotatably supported at the belt displacer lug 270 is illustrated for the sake of simplicity of one-piece constructions. However, it may also be constructed corresponding to the deflection roller 72 of FIG. 3.

The connecting element 266 together with the belt displacer lug 270 is according to FIG. 7 constructed of two shells with a lug lower part 326 arranged to the left in FIGS. 6 and 7 as well as with a lug upper part 328 surrounding the edges of the lug lower part 326. The lug lower part 326 is constructed as solid body at the upper end of the belt displacer 212 in order to be able to receive thereat the detent pin 322 with the aid of a cylindrical through-bore 330. Within the area of the lateral leg ends of the lug 270 the lug bottom part 326 is again constructed solid for the purpose of the bearing support of the shaft stubs 322 of the roller 272. Within the area disposed therebetween the lug bottom part 326 is offset on both sides in such a manner that, on the one hand, an assembly space 334 will result located in FIG. 6 on the right side of the belt displacer 212 and covered by the lug upper part 328, as well as a space 338 open toward the left as viewed in FIG. 6. The space 338 is surrounded U-shaped by the lug bottom part 326 as seen in cross-section in FIG. 7. On the one hand, a weight and material saving and, on the other, a defined bendability of the belt displacer 212 about an axis parallel to the axis 336 (FIG. 5) of the deflection roller result therefrom.

The detent pawl 324 is located within the space 334 between the lug bottom part 326 and the lug upper part 328, which is rotatably supported at the lug bottom part 326 about a pivot pin 340 perpendicular to the plane of the lug 270. For that purpose, a bearing bolt 342 formed-on at the lug bottom part 326 extends through a correspondingly dimensioned bearing aperture of the detent pawl 324. One arm of the detent pawl 324 engages from behind the correspondingly undercut end 346 of the detent pin 322 with its detent head 344. For the unequivocal axial fixing of the detent pin 322, the pin end 346 presses with its end face 348 against a step 350 of the lug bottom part 326 which can be seen in FIG. 5.

The other arm 352 of the detent pawl 324 carries a bearing bolt 354 (FIGS. 5 and 6), at which one end each of two elongated spring bands 360 and 362 are pivotally connected. The two spring bands 360 and 362 lead each to one of the two side legs of the lug 270. The spring end located thereat is in each case rigidly secured at the lug bottom part 326, for example, by a right-angle bending of an end section 364 which is inserted into a corresponding through-aperture 366 of the lug bottom part 326.

Each spring band 360 and 362 is provided with two arcuate portions 368 and 370 which according to FIG. 5 are constructed somewhat narrower than the remaining spring band which abuts flat at the lug bottom part 326. The upper arcuate recess 368, as viewed in FIGS. 5 and 6, is disposed above the lug, properly speaking;

the lower arcuate recess 370 is located in each case in the respective side leg of the lug 270. Both arcuate recesses 368 and 370 are supported against the lug upper part 328. By reason of their approximately cylindrical arcuate shape (axis of the radius of curvature parallel to the axis 336 of the roller 272), the two arcuate recesses 368 and 370 can be pressed correspondingly flatter in case of a reduction of the distance between the lug bottom part 326 and the lug upper part 328 (space depth b of the space 334 within this area perpendicular to the plane of the lug 270). This leads to an increase of the effective length of the respective band 360 and 362 and correspondingly to a pivoting of the detent pawl 324 in the counterclockwise direction in FIG. 5, i.e. out of engagement with the detent pin 322. Such a reduction of the space depth b is obtained directly by a corresponding bending of the belt displacer 212 about a bending axis parallel to the axis 336. Thus, if the belt displacer 212 encounters an obstruction during its return travel into the retracted position, then by reason of the free rotatability of the belt displacer 212 about the detent pin 322, it will at first orient itself in such a manner that the lug 270 abuts flat at the obstruction. During a further movement of the runner 260, a bending of the belt displacer 212 takes place in the indicated sense, whereupon the detent connection 320 is released. The rigidity of the housing formed by the lug bottom part and the lug upper part for the spring bands 360 and 362 however, is so great that during normal operation it will not lead to a bending of such magnitude that the detent connection 320 is released.

The belt displacer 112 is secured again at the detent pin 322 in a simple manner in that one threads the detent pin 222 into the through-bore 230 at the upper end of the belt displacer 112 and displaces the same up to the step 250. Prior to reaching this step, the end 246 of the pin 222 comes into contact with a beveled-off surface 280 of the head 244 of the detent pawl 224, as a result of which it is pivoted slightly in the counterclockwise direction, against the force of the two spring bands 260 and 262. Finally, the detent head 280 then engages behind the undercut 282 of the end 226 of the detent pin 222.

Figure 8:
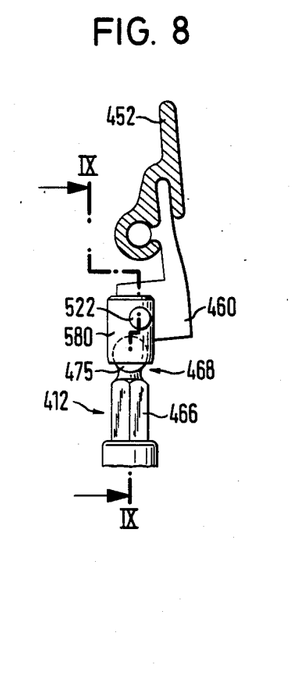
FIG. 8 is a partial elevational view, partly in cross-section, of a further embodiment of a belt displacer within the area of the guide rail, taken alone line VIII—VIII of FIG. 9.
Figure 9:
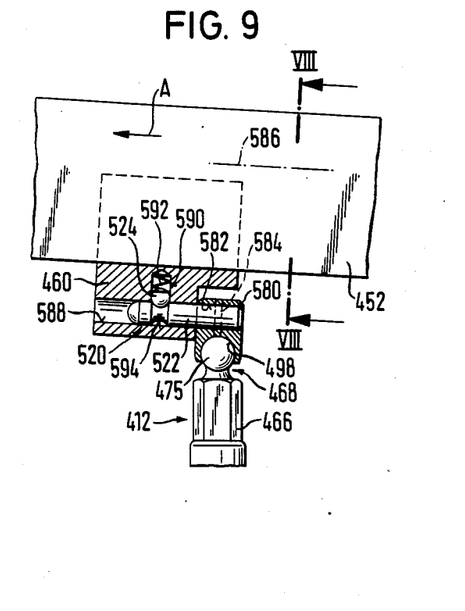
FIG. 9 is a cross-sectional view taken alone line IX—IX of FIG. 8.

In FIGS. 8 and 9 a further embodiment generally designated by reference numeral 412 of a belt displacer is illustrated within the area of its fastening at the guide rail-runner 460. Components which correspond in their function to the elements in FIGS. 1 and 2, are designated by the same reference numerals, however, of the 400 series.

The ball joint 68 which in the embodiment according to FIGS. 1 and 5 is provided between the connecting element 66 and the lug 70, is now located at the upper end of the connecting element and is generally designated by reference numeral 468. Of course, such a ball joint may also be provided at the lower end or at both ends. A ball 475 provided at the upper end of the connecting element 466 engages in a correspondingly shaped aperture 498 of a connecting part 580 which is again attached at the runner 460 by a detent connection generally designated by reference numeral 520. This detent connection 520 consists, on the one hand, of a detent pin 52 rigidly attached at the connecting part 580. The detent pin 522 is inserted into a corresponding aperture 582 of the connecting part 580 and is secured thereat with the aid of a fastening pin 584 transversely extending through the detent pin 522. The detent pin 522 is inserted into a through bore 588 of the runner 460 which extends parallel to the guide rail longitudinal direction 586 (FIG. 9) and is matched to the detent pin diameter. A detent ball 524 which is inserted into a dead-end bore 590 radially terminating in the through-bore 588, is prestressed into the through-bore 588 by a coil spring 592 supported against the bottom of the mounting bore 590. In order that that ball 524 is not lost, the orifice of the assembly bore 590 into the through-bore 588 is correspondingly narrowed. With an inserted detent pin 522 the ball 524 engages in a circumferential groove 594 of the detent pin 522.

The detent pin 522 is inserted into the through bore 588 from the side of the runner 460 which is the rear side of the runner 460 in relation to the movement direction A (FIG. 9) of the belt displacer 212 in the direction toward the retracted position according to FIG. 1 (in FIG. 9, right side). Accordingly, the detent connection 520 is then automatically released if during such a return movement of the belt displacer, the latter encounters an obstacle.

The tensional forces which then occur in a direction parallel to the guide rail longitudinal direction 586, pull the detent pin 522 out of the through-bore 588.

For re-establishing the detent connection 520 it is only necessary to reinsert the detent pin 522 which is rounded off at its forward end, into the through-bore 588 from the right side in FIG. 9.

The embodiments according to the present invention are characterized by very great user ease, pleasing styling and high safety especially by reason of the simple and easy ability to decouple the belt displacer from the guidance.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A safety belt system comprising belt displacer means operable to displace a section of a three-point safety belt between a retracted position and a seizing position for facilitating fastening of the belt, the three-point safety belt being attached with its belt ends at a relatively fixed part on one side of a seat, said belt ends extending over a belt base point and a belt shoulder point, belt retracting means, a belt buckle provided on the belt between the belt ends for inserting into a belt lock means arranged on the other side of the seat, the belt displacer means including a belt deflection means engaging with the belt within the area between the belt ends and displaceable along the belt, the belt buckle being arranged within the area of the belt deflection means in said seizing position, said belt displacer means being operable to travel into its retracted position with the belt buckle removed from the belt displacer means, and wherein the belt end on the side of the shoulder point is operatively connected with the belt retracting means, further comprising an abutment element for the belt buckle attached to the belt intermediate the belt deflection means and the belt base point, said abutment element permitting a movement of the belt buckle only between the abutment element and the belt deflection means.

2. A safety belt system according to claim 1, wherein the belt displacer means includes a connecting element operatively connecting the belt deflection means with a guide-rail runner means.

3. A safety belt system according to claim 2, wherein the connecting element is bending-elastic.

4. A safety belt system according to claim 3, wherein the belt displacer means is detachably attached at the runner means in such a manner that the connection becomes disengaged when the belt displacer means encounters an obstacle during return travel into the retracted position.

5. A safety belt system according to claim 4, further comprising a detent connecting means between the belt displacer means and the runner.

6. A safety belt system according to claim 5, wherein said detent connecting means includes a detent pin provide at one of the two parts consisting of runner means and belt displacer means, said detent pin being operable to engage in a pin aperture of the respectively other part and a detent element which is retained at the other part, being operable to engage in a detent aperture of the detent pin.

7. A safety belt system according to claim 4, wherein said runner means is operatively connected with the belt displacer means by way of a detent pawl connecting means.

8. A safety belt system according to claim 7, wherein the detent pawl connecting means is operable to release automatically in case of bending of the belt displacer means.

9. A safety belt system according to claim 4, wherein the belt deflection means substantially surrounding the belt is constructed so that it can be opened for the insertion and removal of the belt.

10. A safety belt system comprising belt displacer means operable to displace a section of a three-point safety belt between a retracted position and a seizing position for facilitating fastening of the belt, the three-point safety belt being attached with its belt ends at a relatively fixed part on one side of a seat, said belt ends extending over a belt base point and a belt shoulder point, belt retracting means, a belt buckle provided on the belt between the belt ends for inserting into a belt lock means arranged on the other side of the seat, the belt displacer means including a belt deflection means engaging with the belt within the area between the belt ends and displaceable along the belt, the belt buckle being arranged within the area of the belt deflection means in said seizing position, said belt displacer means being operable to travel into its retracted position with the belt buckle removed from the belt displacer means, and
wherein the belt deflection means substantially surrounding the belt is constructed so that it can be opened for the insertion and removal of the belt.

11. A safety belt system according to claim 10, wherein the belt deflection means includes a deflection roller means rotatably supported at a lug means of the belt displacer means.

12. A safety belt system according to claim 11, wherein the deflection roller means is detachably mounted at the lug means.

13. A safety belt system according to claim 12, wherein the deflection roller means is of two-partite construction with roller parts displaceable toward one another in the axial direction.

14. A safety belt system according to claim 13, wherein said roller parts are displaceable toward one another against a spring force.

15. A safety belt system comprising belt displacer means operable to displace a section of a three-point safety belt between a retracted position and a seizing position for facilitating fastening of the belt, the three-point safety belt being attached with its belt ends at a relatively fixed part on one side of a seat, said belt ends extending over a belt base point and a belt shoulder point, belt retracting means, a belt buckle provided on the belt between the belt ends for inserting into a belt lock means arranged on the other side of the seat, the belt displacer means including a belt deflection means engaging with the belt within the area between the belt ends and displaceable along the belt, the belt buckle being arranged within the area of the belt deflection means in said seizing position, said belt displacer means being operable to travel into its retracted position with the belt buckle removed from the belt displacer means, and
including a connecting element operatively connecting the belt deflection means with a guide-rail runner means, and
wherein the connecting element is rotatably supported at one of the two parts consisting of belt deflection means and runner means about an axis substantially parallel to the longitudinal axis of the connecting element.

16. A safety belt system according to claim 15, wherein said connecting element is rotatable through 360°.

17. A safety belt system according to claim 15, wherein the connecting element is tiltably supported at one of the two parts consisting of belt deflection means and runner means about a tilting axis substantially perpendicular to the longitudinal axis of the connecting element.

18. A safety belt system according to claim 17, further comprising a ball joint operatively connecting the connecting element with said one part.

19. A safety belt system comprising belt displacer means operable to displace a section of a three-point safety belt between a retracted position and a seizing position for facilitating fastening of the belt, the three-point safety belt being attached with its belt ends at a relatively fixed part on one side of a seat, said belt ends extending over a belt base point and a belt shoulder point, belt retracting means, a belt buckle provided on the belt between the belt ends for inserting into a belt lock means arranged on the other side of the seat, the belt displacer means including a belt deflection means engaging with the belt within the area between the belt ends and displaceable along the belt, the belt buckle being arranged within the area of the belt deflection means in said seizing position, said belt displacer means being operable to travel into its retracted position with the belt buckle removed from the belt displacer means, and
including a connecting element operatively connecting the belt deflection means with a guide-rail runner means, and
wherein the belt displacer means is detachably attached at the runner means in such a manner that the connection becomes disengaged when the belt displacer means encounters an obstacle during return travel into the retracted position.

20. A safety belt system according to claim 19, further comprising a detent connecting means between the belt displacer means and the runner 21. A safety belt system according to claim 20, wherein said detent connecting means includes a detent pin provided at one of the two parts consisting of runner means and belt displacer means, said detent pin being operable to engage in a pin aperture of the respectively other part and a detent element which is retained at the other part, being operable to engage in a detent aperture of the detent pin.

22. A safety belt system according to claim 21, wherein said detent element is spring loaded.

23. A safety belt system with guide rail means for the runner means according to claim 21, wherein the detent pin extends substantially parallel to the longitudinal direction of the guide rail means.

24. A safety belt system according to claim 21, wherein the detent pin is essentially cylindrically shaped.

25. A safety belt system according to claim 21, wherein said detent element is a detent ball prestressed by a spring.

26. A safety belt system according to claim 19, wherein said runner means is operatively connected with the belt displacer means by way of a detent pawl connecting means.

27. A safety belt system according to claim 26, wherein the detent pawl connecting means is operable to release automatically in case of bending of the belt displacer means.

28. A safety belt system according to claim 27, wherein said detent pawl connecting means includes a detent pawl supported at the belt displacer means, said detent pawl being operable to be actuated by at least one spring band inserted into a hollow space of the belt displacer means, whose one end is supported at the detent pawl and whose other end is supported at the belt displacer means, and whose effective length changes in case of a bending of the belt displacer means.

29. A safety belt system according to claim 28, wherein at least one spring band includes arcuate recesses clamped-in between mutually oppositely disposed hollow space walls.

30. A safety belt system, particularly in a motor vehicle, comprising a belt displacer means that is connected wtih a force transmission element that can be actuated by a drive unit, said belt displacer means being movable between two end positions to adjust the position of a safety belt, and comprising a belt-deflection means connecting the belt displacer means to the safety belt via a locking connection, the locking connection opening up when the belt displacer means encounters an obstacle in its movement between the two end positions, the locking connections including a latch means connected to the safety belt, a locking part connected to the displacer means and equipped with a locking recess for the latch means, and at least one triggering element connected to the belt-deflection means and operable to release the latch means from the locking part, when the belt-deflection means is bent, in response to a different bending deformation between the triggering element and the belt-deflection mean.

31. A safety belt system according to claim 30, wherein the triggering means is actuated by at least one flat keep spring inserted into a hollow space of the belt deflection means, one end of said spring being connected to the latch means and another end of said spring being connected to the belt deflection means, and wherein an effective length of said spring is changed when the belt deflection means is bent.

32. A safety belt system according to claim 31, wherein the at least one flat keep spring has arched portions located in the hollow space and between two opposed walls of the belt-deflection means.

* * * * *